United States Patent
Kim et al.

(10) Patent No.: US 10,778,395 B2
(45) Date of Patent: Sep. 15, 2020

(54) METHOD AND APPARATUS FOR REPORTING FEEDBACK INFORMATION IN WIRELESS COMMUNICATION SYSTEM

(71) Applicant: LG ELECTRONICS INC., Seoul (KR)

(72) Inventors: Hyungtae Kim, Seoul (KR); Kijun Kim, Seoul (KR); Byounghoon Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 14/913,927

(22) PCT Filed: Sep. 26, 2014

(86) PCT No.: PCT/KR2014/009025
§ 371 (c)(1),
(2) Date: Feb. 23, 2016

(87) PCT Pub. No.: WO2015/046949
PCT Pub. Date: Apr. 2, 2015

(65) Prior Publication Data
US 2016/0204910 A1    Jul. 14, 2016

Related U.S. Application Data

(60) Provisional application No. 61/883,178, filed on Sep. 26, 2013, provisional application No. 61/886,668, (Continued)

(51) Int. Cl.
*H04L 5/00* (2006.01)
*H04B 17/318* (2015.01)
(Continued)

(52) U.S. Cl.
CPC ............ *H04L 5/005* (2013.01); *H04B 7/024* (2013.01); *H04B 7/0417* (2013.01); *H04B 17/318* (2015.01); *H04W 56/001* (2013.01)

(58) Field of Classification Search
CPC ... H04W 56/001; H04B 17/318; H04B 7/024; H04B 7/0417
See application file for complete search history.

(56) References Cited

U.S. PATENT DOCUMENTS

2009/0170437 A1* 7/2009 Bhattad ............... H04L 1/0026
455/63.1
2011/0317641 A1* 12/2011 Noh .................... H04L 1/0027
370/329

(Continued)

FOREIGN PATENT DOCUMENTS

KR   10-2012-0003956 A    1/2012
KR   10-2013-0096706 A    8/2013

*Primary Examiner* — Noel R Beharry
*Assistant Examiner* — Pamit Kaur
(74) *Attorney, Agent, or Firm* — Birch, Stewart, Kolasch & Birch, LLP

(57) ABSTRACT

A method is provided for reporting feedback information of Multicast-Broadcast Single-Frequency Network (MBSFN) transmission by a user equipment in a wireless communication system. The user equipment receives configuration information for feedback information of the MBSFN transmission when the user equipment receives signals from a plurality of base stations based on the MBSFN transmission, and transmits the feedback information measured in a resource region according to the configuration information. The user equipment receives a common reference signal (CRS) of an antenna port 0 of an interference cell from the interference cell in an MBSFN area, and the feedback information is measured in the resource region considering a position of a symbol allocated the CRS of the antenna port 0 of the interference cell.

14 Claims, 10 Drawing Sheets

Related U.S. Application Data filed on Oct. 4, 2013, provisional application No. 61/903,922, filed on Nov. 13, 2013.

(51) Int. Cl.
*H04W 56/00* (2009.01)
*H04B 7/024* (2017.01)
*H04B 7/0417* (2017.01)

(56) References Cited

U.S. PATENT DOCUMENTS

| | | | |
|---|---|---|---|
| 2012/0026929 A1 | 2/2012 | Wang et al. | |
| 2012/0099505 A1 | 4/2012 | Wang et al. | |
| 2012/0230290 A1* | 9/2012 | Seo | H04L 1/0026 370/329 |
| 2012/0327801 A1* | 12/2012 | Seo | H04B 1/74 370/252 |
| 2013/0003578 A1 | 1/2013 | Hu et al. | |
| 2013/0114496 A1 | 5/2013 | Mazzarese et al. | |
| 2013/0170423 A1 | 7/2013 | Abe et al. | |
| 2013/0258965 A1* | 10/2013 | Geirhofer | H04W 72/048 370/329 |
| 2013/0294271 A1* | 11/2013 | Nagata | H04W 24/10 370/252 |
| 2014/0078919 A1* | 3/2014 | Hammarwall | H04L 5/0057 370/252 |
| 2014/0334350 A1* | 11/2014 | Suzuki | H04W 72/005 370/280 |
| 2014/0341058 A1* | 11/2014 | Takano | H04W 24/08 370/252 |
| 2015/0296411 A1* | 10/2015 | Meyer | H04W 72/0446 370/336 |

\* cited by examiner

FIG. 5
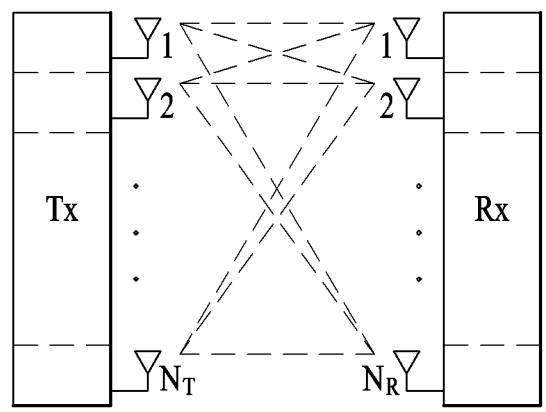
(a)
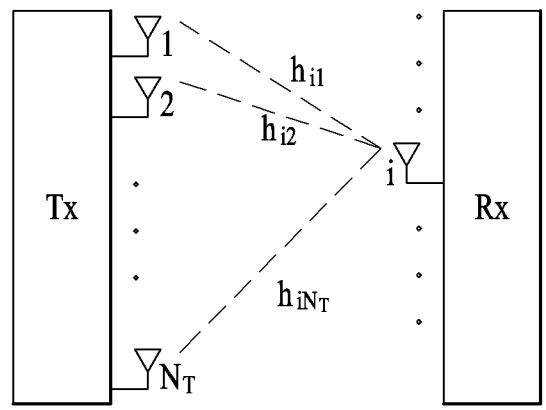
(b)

METHOD AND APPARATUS FOR REPORTING FEEDBACK INFORMATION IN WIRELESS COMMUNICATION SYSTEM

CROSS REFERENCE TO RELATED APPLICATIONS

This application is the National Phase of PCT International Application No. PCT/KR2014/009025, filed on Sep. 26, 2014, which claims priority under 35 U.S.C. 119(e) to U.S. Provisional Application Nos. 61/883,178 filed on Sep. 26, 2013, 61/886,668 filed on Oct. 4, 2013 and 61/903,922 filed on Nov. 13, 2013, all of which are hereby expressly incorporated by reference into the present application.

TECHNICAL FIELD

The present invention relates to a wireless communication system, and more particularly, to a method of reporting feedback information in a manner that a user equipment receives configuration information for feedback information of Multi-Broadcast Single-Frequency Network (MBSFN) transmission and transmits the feedback information of the MBSFN MSFN transmission measured in a resource region according to the configuration information and an apparatus therefor.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Research on coordinated multi-point (CoMP) for improving throughput of a UE located at a cell boundary by applying improved MIMO to a multi-cell environment is actively performed. The CoMP system can decrease inter-cell interference in a multi-cell environment and improve system performance.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DISCLOSURE OF THE INVENTION

Technical Tasks

The present invention intends to propose a method of reporting feedback information in a wireless communication system and an apparatus therefor in the following based on the aforementioned discussion.

The present invention intends to propose a method for a user equipment to receive configuration information for feedback information of MBSFN transmission and transmit the feedback information of MBSFN transmission measured in a resource region according to the configuration information.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of reporting feedback information of MBSFN transmission in a wireless communication system includes the steps of receiving configuration information for feedback information of the MBSFN transmission and transmitting the feedback information measured in a resource region according to the configuration information. In this case, the feedback information can be determined based on a position of a symbol in which a common reference signal (CRS) of an antenna port 0 of an interference cell is transmitted in an MBSFN area.

To further achieve these and other advantages and in accordance with the purpose of the present invention, according to a different embodiment, a user equipment reporting feedback information of MBSFN transmission in a wireless communication system can include a radio frequency (RF) unit and a processor, the processor configured to receive configuration information for feedback information of the MBSFN transmission, the processor configured to transmit the feedback information measured in a resource region according to the configuration information. In this case, the feedback information can be determined based on a position of a symbol in which a CRS of an antenna port 0 of an interference cell is transmitted in an MBSFN area.

Items described in the following can be commonly applied to the embodiments according to the present invention.

If a CP (cyclic prefix) of the interference cell corresponds to an extended CP, the feedback information can be determined based on an MBSFN RSSI (received signal strength indicator) measured in the position of the symbol in which the CRS (common reference signal) of the antenna port 0 of the interference cell is transmitted.

The feedback information can include the MBSFN RSSI measured in a symbol 3 of a first slot and a symbol 0 and a symbol 3 of a second slot in an MBSFN subframe.

If a CP (cyclic prefix) of the interference cell corresponds to a normal CP, the feedback information can be determined based on an MBSFN RSSI (received signal strength indicator) measured in a symbol position at which an MBSFN symbol and all or a part of the symbol in which the CRS (common reference signal) of the antenna port 0 of the interference cell are overlapped.

The feedback information can include the MBSFN RSSI measured in a symbol 3 and a symbol 4 of a first slot and a symbol 0, a symbol 3 and a symbol 4 of a second slot in an MBSFN subframe.

The feedback information can be determined based on an MBSFN RSSI (received signal strength indicator) measured in a symbol 3 and a symbol 4 of a first slot and a symbol 0, a symbol 3 and a symbol 4 of a second slot in an MBSFN subframe irrespective of a CP (cyclic prefix) of the interference cell.

The feedback information can be determined based on an MBSFN RSSI (received signal strength indicator) measured in a symbol 3 of a first slot and a symbol 0 and a symbol 3 of a second slot in an MBSFN subframe irrespective of a CP (cyclic prefix) of the interference cell.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWING

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a schematic diagram illustrating a wireless communication system having multiple antennas;

BEST MODE

Mode for Invention

Figure 1:
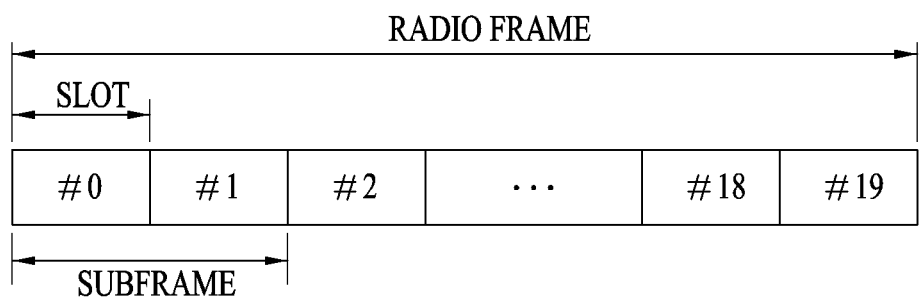
FIG. 1 is a diagram illustrating an example of a structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE—Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
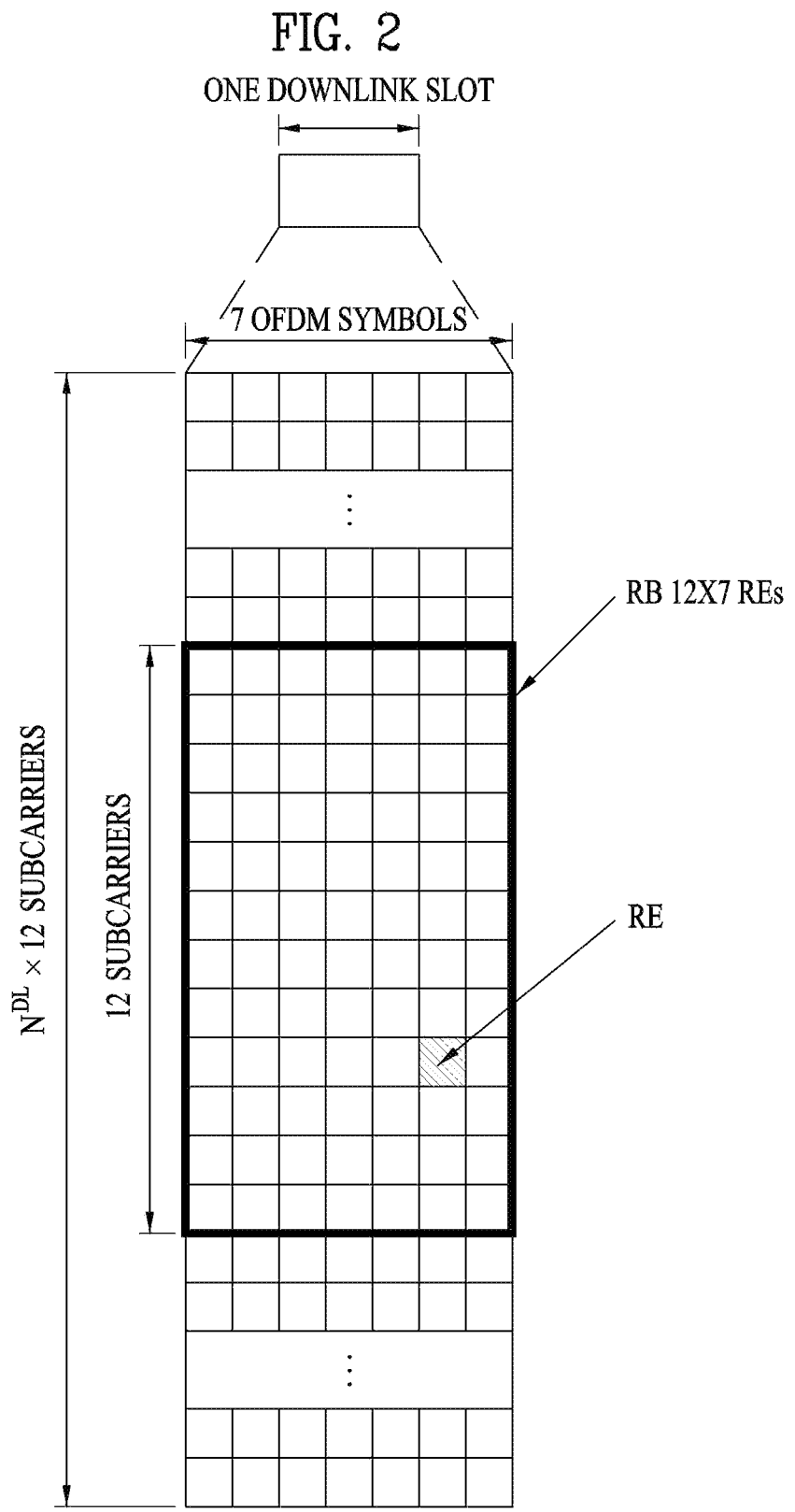
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

Figure 3:
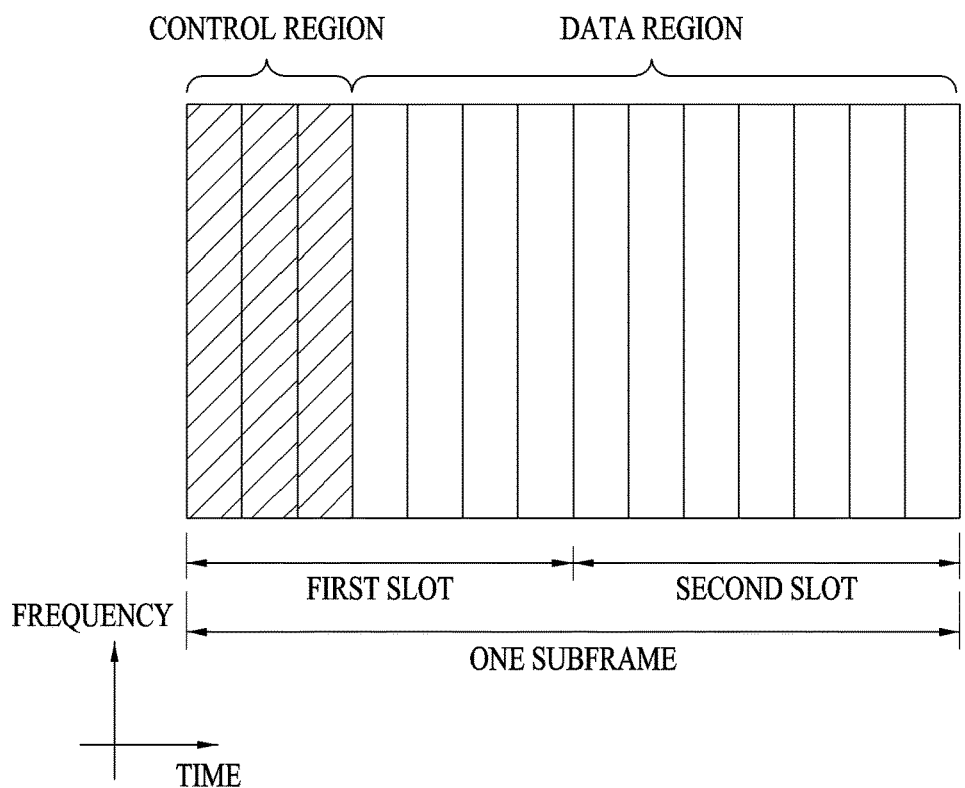
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
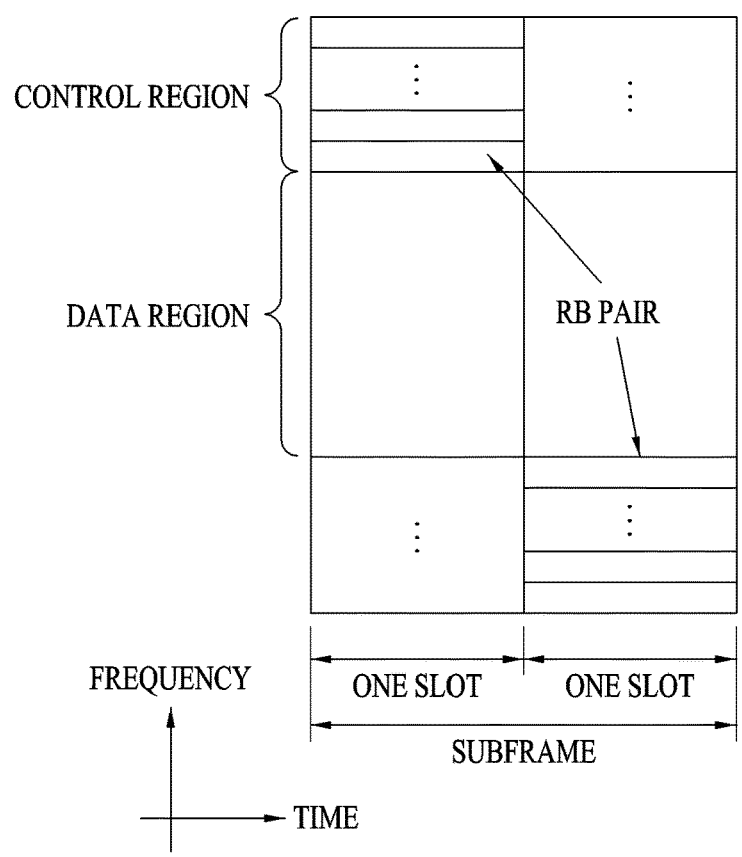
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver.

Therefore, transmission rate may be increased and frequency efficiency may be remarkably increased. As channel transmission rate is increased, transmission rate may be increased, in theory, to the product of a maximum transmission rate Ro that may be achieved with a single antenna and a transmission rate increase Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted through the NT Tx antennas, as expressed in Equation 2 below.

$$S = [S_1, S_2, \ldots, S_{N_T}] \qquad \text{[Equation 2]}$$

A different transmission power may be applied to each piece of transmission information, $S_1, S_2, \ldots, S_{N_T}$. Let the transmission power levels of the transmission information be denoted by $P_1, P_2, \ldots, P_{N_T}$, respectively. Then the transmission power-controlled transmission information vector is given as $$\hat{S} = [\hat{S}_1, \hat{S}_2, \ldots, \hat{S}_{N_T}]^T = [P_1 S_1, P_2 S_2, \ldots, P_{N_T} S_{N_T}]^T \qquad \text{[Equation 3]}$$

The transmission power-controlled transmission information vector $\hat{S}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

NT transmission signals $X_1, X_2, \ldots, X_{N_T}$ may be generated by multiplying the transmission power-controlled information vectors $\hat{S}$ by a weight matrix W. The weight matrix W functions to appropriately distribute the transmission information to the Tx antennas according to transmission channel states, etc. These NT transmission signals $X_1, X_2, \ldots, X_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

Here, $W_{ij}$ refers to a weight between an ith Tx antenna and jth information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of NR Rx antennas, a reception signal of each antenna may be expressed as the vector shown in Equation 6 below.

$$y = [y_1, y_2, \ldots, y_{N_R}]^T$$ [Equation 6]

When a channel modeling is executed in the MIMO communication system, individual channels can be distinguished from each other according to transmission/reception (Tx/Rx) antenna indexes. A channel passing the range from a Tx antenna j to an Rx antenna i is denoted by hij. It should be noted that the index order of the channel hij is located before a reception (Rx) antenna index and is located after a transmission (Tx) antenna index.

FIG. 5(b) illustrates channels from NT Tx antennas to an Rx antenna i. The channels may be collectively represented in the form of vector and matrix. Referring to FIG. 5(b), the channels passing the range from the NT Tx antennas to the Rx antenna i can be represented by the Equation 7 below.

$$h_i^T = [h_{i1}, h_{i2}, \ldots, h_{iN_T}]$$ [Equation 7]

All channels passing the range from the NT Tx antennas to NR Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$

[Equation 8]

Additive white Gaussian noise (AWGN) is added to an actual channel which has passed the channel matrix. The AWGN (n1, n2, . . . , nNR) added to each of NR reception (Rx) antennas can be represented by Equation 9 below.

$$n = [n_1, n_2, \ldots, n_{N_R}]^T$$ [Equation 9]

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

[Equation 10]

The number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR X NT matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R)$$ [Equation 11]

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
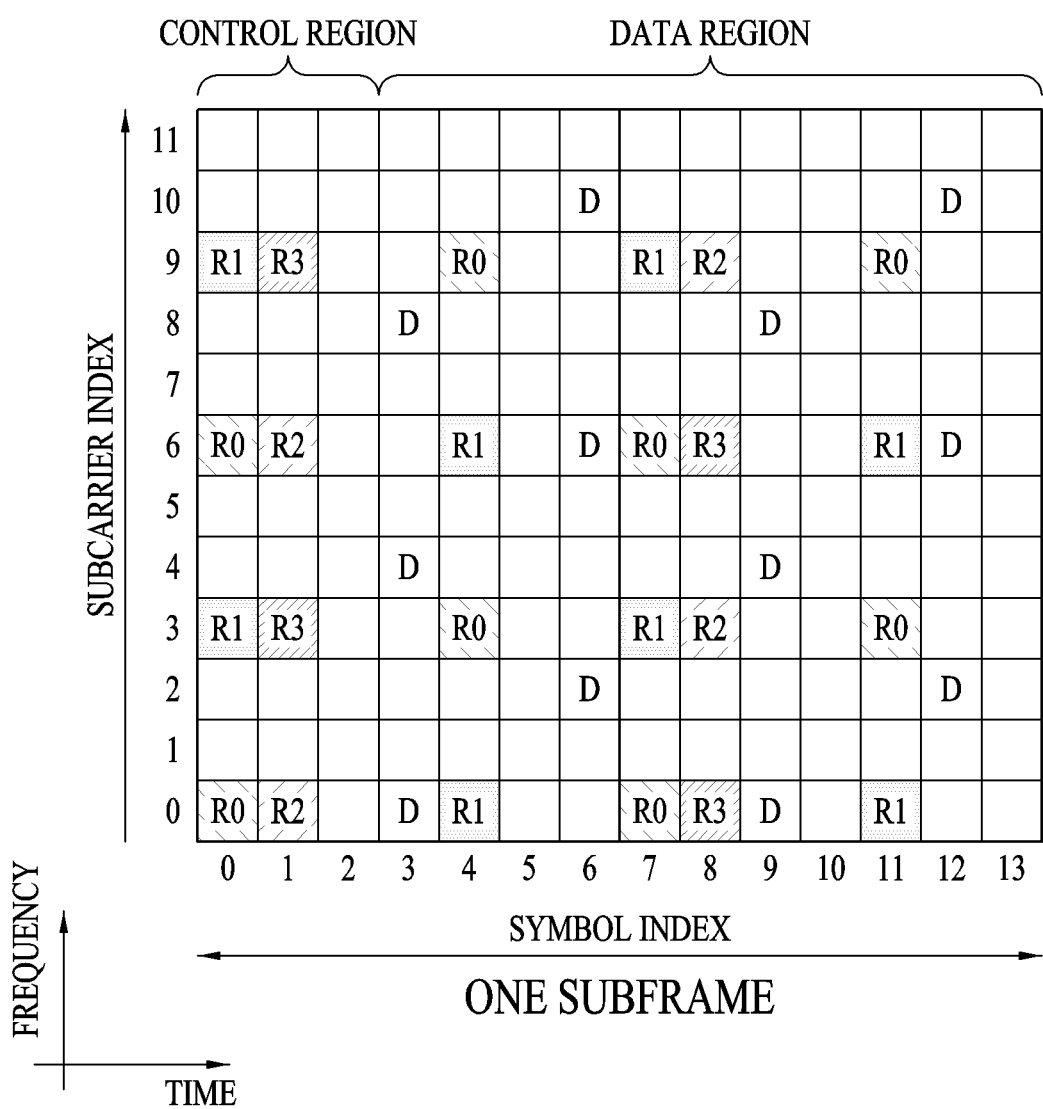
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
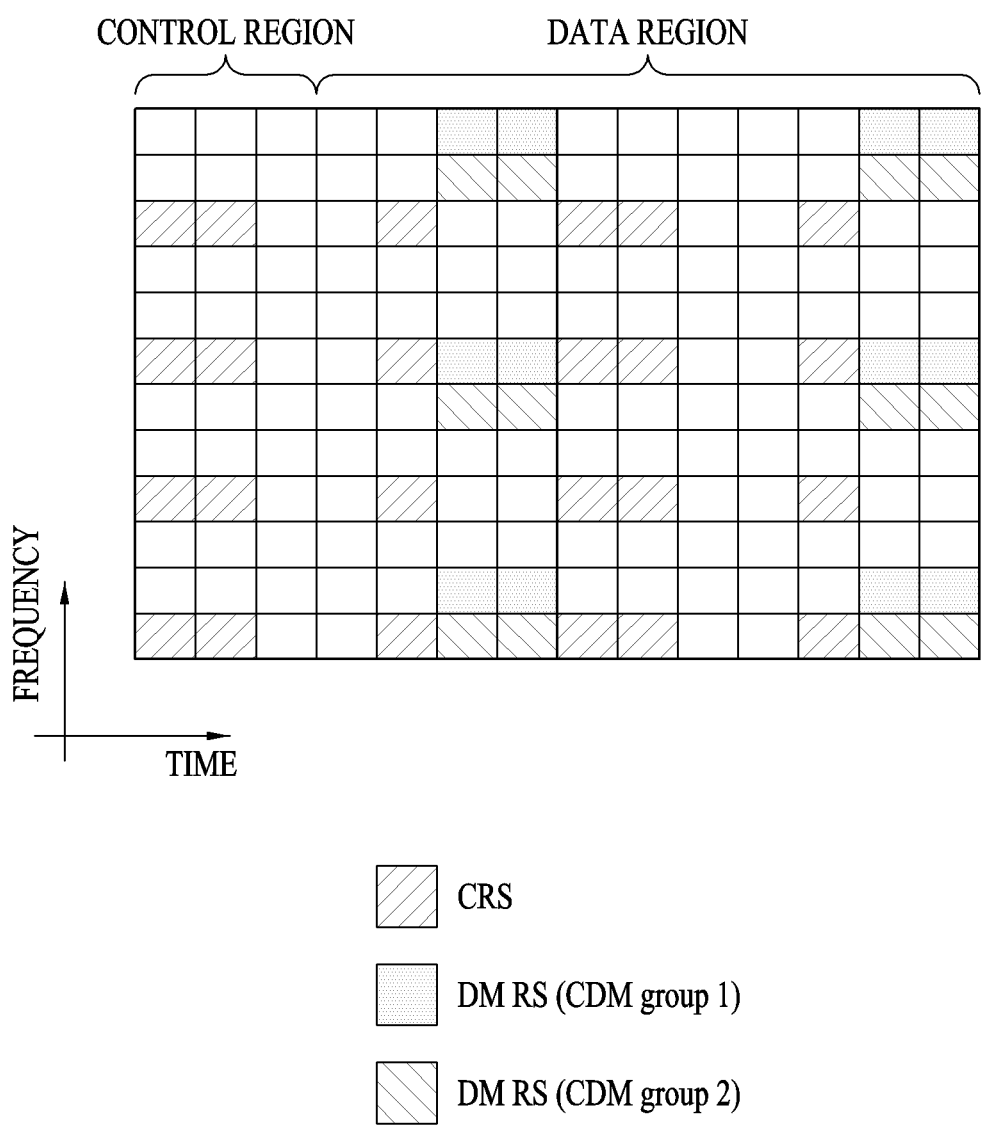
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
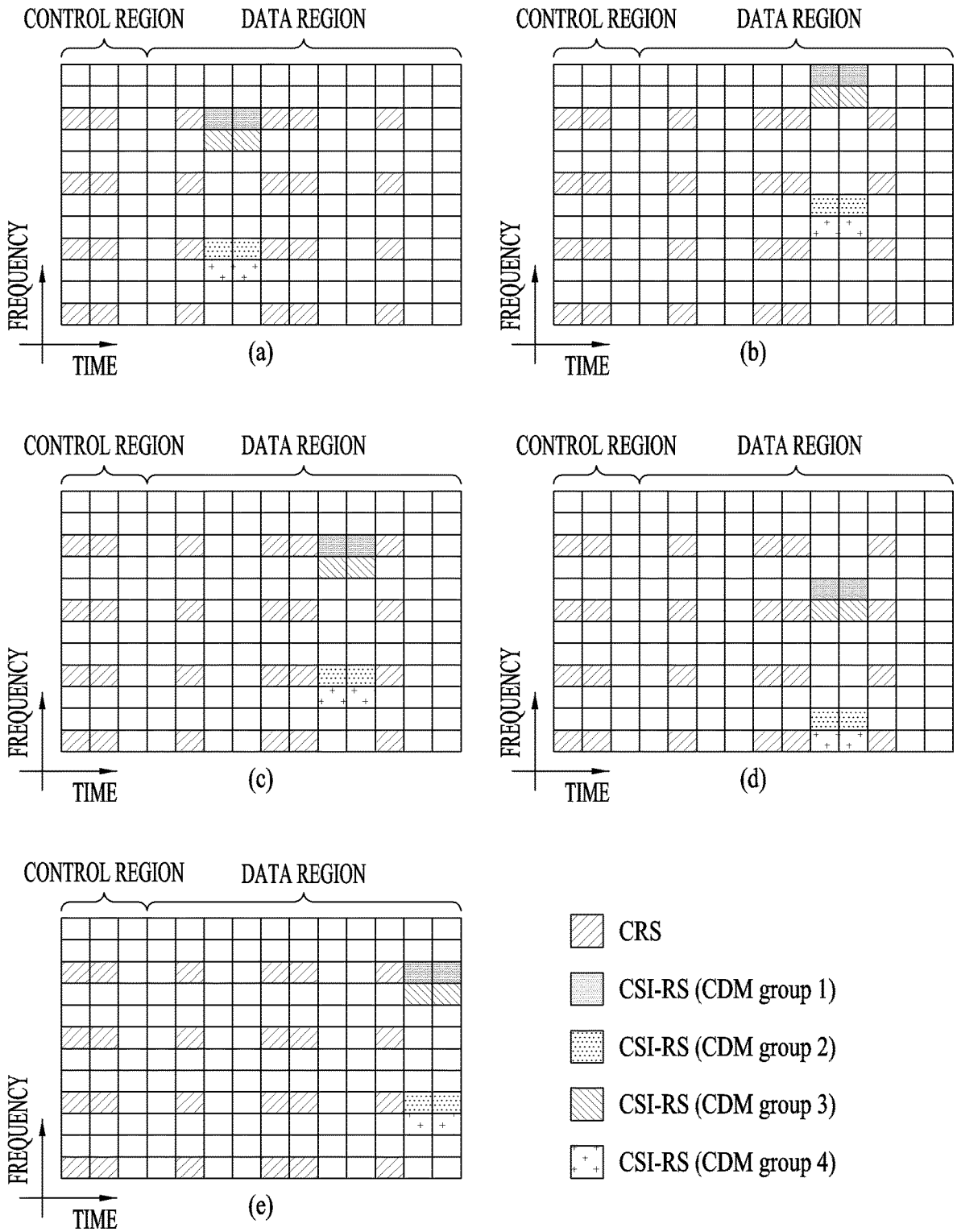
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

Figure 9:
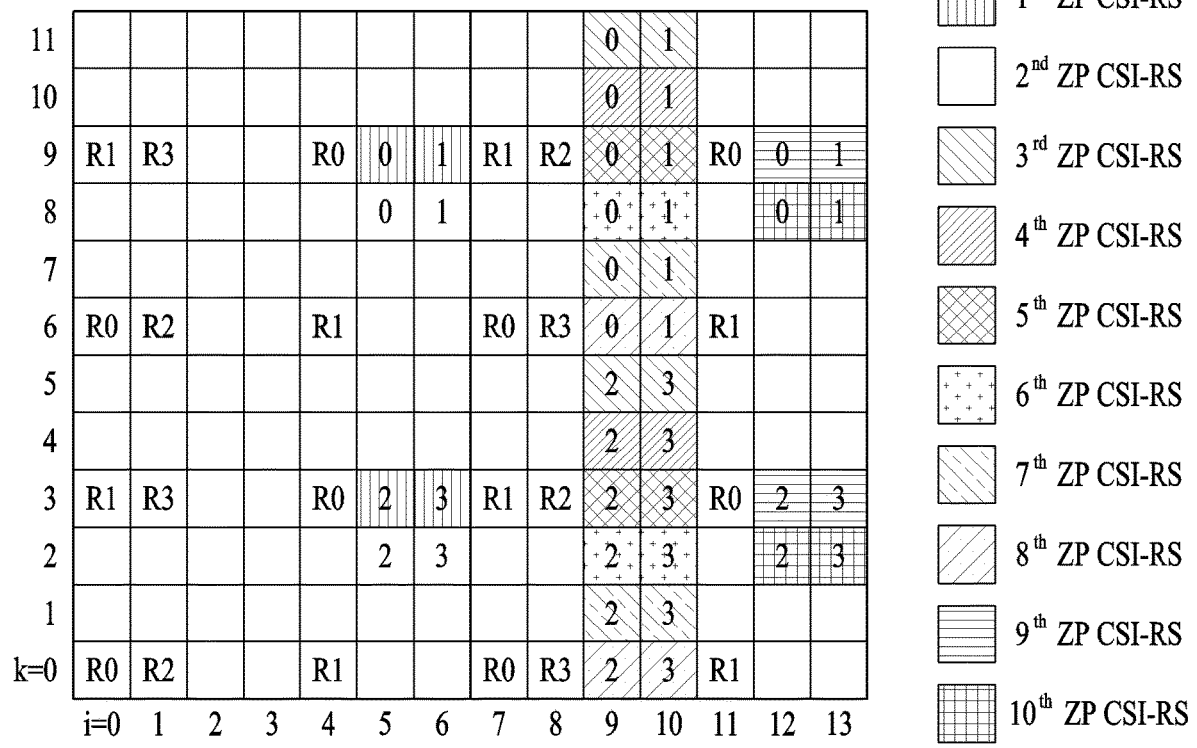
FIG. 9 is a diagram for an example of a ZP (zero power) CSI-RS pattern.

FIG. 9 illustrates an example of a ZP (Zero Power) CSI-RS pattern, which is defined in the LTE-A system. The purpose of ZP CSI-RS is broadly divided into two purposes. A first purpose corresponds to a purpose for enhancing CSI-RS performance. More specifically, in order to enhance a CSI-RS measurement performance of another network, one network performs muting on a CSI-RS RE of the other network, and, then, in order to allow its own UE to be capable of correctly performing rate matching, the corresponding network may configure the muted RE to the ZP CSI-RS and may then notify such configuration. A second purpose corresponds to a purpose of performing interference measurement for CoMP CQI calculation. More specifically, part of the network performs muting on the ZP CRS-RS RE, and the UE may calculate the CoMP CQI by measuring the interference from this ZP CSI-RS.

The RS patterns illustrated in FIGS. 6, 7, 8 and 9 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

Cooperative transmission (CoMP) System

In the following, CoMP (Cooperative Multipoint Transmission/Reception) is explained.

A system appearing after LTE-A intends to introduce a scheme of enhancing performance of a system, which is enhanced by enabling many cells to cooperate with each other. This sort of scheme is called a cooperative Multipoint Transmission/Reception (hereinafter abbreviated CoMP). The CoMP is a scheme used by 2 or more base stations, access points or cells to cooperatively communicate with a user equipment to smoothly perform communication between the specific user equipment and the base stations, the access points or the cells. Throughout the present invention, a base station, an access point or a cell can be used as an identical meaning.

In general, inter-cell interference may decrease performance of a user equipment situated at a cell boundary and throughput of an average sector in a multi-cell environment where a frequency reuse index corresponds to 1. In order to reduce the inter-cell interference, a legacy LTE system adopted a simple and passive method such as a fractional frequency reuse (FFR) via UE-specific power control for a user equipment situated at a cell boundary to have a reasonable performance efficiency in an interference-limited environment. Yet, instead of reducing the use of frequency resource per each cell, it may be more preferable to reduce the ICI or reuse the ICI with a signal desired by a user equipment. In order to achieve the aforementioned purpose, the CoMP transmission scheme can be applied.

Figure 10:
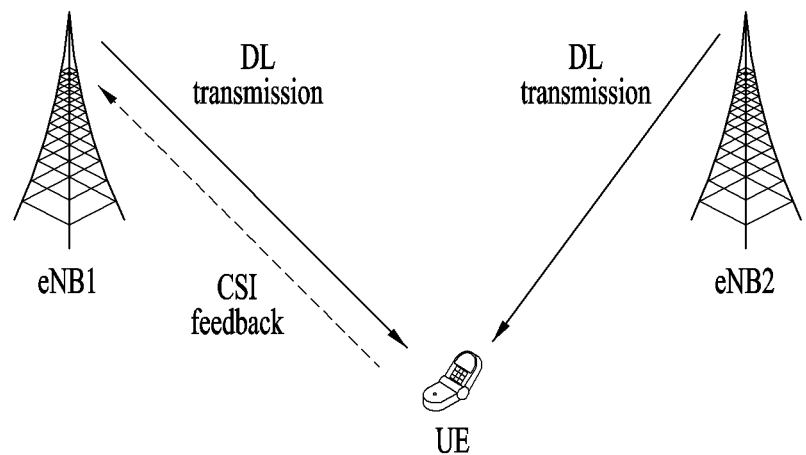
FIG. 10 is a diagram for an example of performing CoMP.

FIG. 10 is a diagram for an example of performing CoMP. Referring to FIG. 10, a wireless communication system includes a plurality of base stations (a BS 1, a BS 2 and a BS 3) performing the CoMP and a user equipment. A plurality of the base stations (the BS 1, the BS 2 and the BS 3) performing the CoMP can efficiently transmit data to the user equipment in a manner of cooperating with each other.

The CoMP can be mainly classified into CoMP Joint Processing (CoMP-JP) of a cooperative MIMO form through data sharing and Cooperative scheduling/beamforming (CoMP-CS/CB).

In case of downlink, according to the joint processing scheme (CoMP-JP), a UE can receive data from a plurality of base stations performing CoMP transmission scheme at the same time and may be able to enhance reception capability by combining signals received from a plurality of the base stations with each other (Joint Transmission, JT). And, it may consider a method that a base station among a plurality of the base stations performing the CoMP transmission scheme transmits data to a UE at specific time (Dynamic point selection, DPS). In case of the coordinated scheduling/beamforming scheme (CoMP-CS/CB), a UE can instantaneously receive data from a base station, i.e., a serving base station, via beamforming.

If the joint processing (CoMP-JT) scheme is applied in uplink, a plurality of base stations can receive a PUSCH signal from a UE at the same time (joint reception, JR). Unlikely, in case of coordinated scheduling/beamforming scheme (CoMP-CS/CB), a single base station can receive PUSCH only. It is able to determine to use the coordinated scheduling/beamforming scheme (CoMP-CS/CB) by cooperative cells (or base stations).

CSI (channel state Information) Feedback in Cooperative Transmission (CoMP) System A UE using a CoMP transmission scheme, i.e., a CoMP UE, can make a feedback on channel information (hereinafter, CSI feedback) to a plurality of base stations that perform the CoMP transmission scheme. A network scheduler can select an appropriate CoMP transmission scheme capable of increasing a transfer rate from the CoMP-JT, the CoMP-CS/CB and the DPS scheme based on the CSI feedback. To this end, as a method for the CoMP UE to configure a CSI feedback in a plurality of the base stations performing the CoMP transmission scheme, it may follow a periodical feedback transmission scheme using UL PUCCH. In this case, a feedback configuration for each of a plurality of the base stations may be independent from each other. Hence, in the present specification according to one embodiment of the present invention, each operation for making a feedback on channel information with an independent feedback configuration is referred to as a CSI process. One or more CSI processes may exist in a serving cell.

FIG. 10 is a diagram for an example of performing CoMP.

In FIG. 10, a UE is located between an eNB1 and an eNB2 and the two eNBs (i.e., the eNB1 and the eNB2) perform an appropriate CoMP operation such as JT, DCS, or CS/CB to solve an interference problem affecting the UE. The UE performs CSI feedback to help the CoMP operation of the eNBs. Information transmitted via the CSI feedback includes PMI information and CQI information of each eNB. Additionally, the information can include channel information (e.g., phase off information between two eNB channels) between the two eNBs for JT.

In FIG. 10, although the UE transmits a CSI feedback signal to the eNB1 corresponding to a serving cell of the UE, the UE can transmit the CSI feedback signal to the eNB2 or both the eNB1 and the eNB2 depending on a situation. And, although FIG. 10 explains a basic unit for participating in CoMP as an eNB, not only the eNB but also a transmission point controlled by the eNB may become the basic unit participating in the CoMP.

In order to perform CoMP scheduling in a network, it is necessary for a UE to make a feedback not only on downlink CSI information of a serving eNB but also on downlink CSI information of a neighbor eNB participating in CoMP. To this end, the UE makes a feedback on a plurality of CSI processes reflecting various data transmitting eNBs and various interference environments.

Hence, when CoMP CSI is calculated in LTE system, it may use an IMR (interference measurement resource) for interference measurement. A plurality of IMRs can be configured to a single UE and each of a plurality of the IMRs has an independent configuration. In particular, a period, an offset and a resource configuration are independently set to each of a plurality of the IMRs and an eNB can signal a UE using higher layer signaling such as RRC (radio resource control) signaling and the like.

When CoMP CSI is calculated in LTE system, it may use a CSI-RS to measure a desired channel. A plurality of CSI-RSs can be configured to a single UE. In this case, each of a plurality of the CSI-RSs has an independent configuration. In particular, a period, an offset, a resource configuration, power control (Pc) and an antenna port number are independently set to each of a plurality of the CSI-RSs. An eNB can transmit information relevant with a CSI-RS to a UE via higher layer signaling (RRC, etc.).

Among a plurality of the CSI-RSs and a plurality of the IMRs set to the UE, it is able to define a single CSI process in a manner of associating a single CSI-RS resource for measuring a signal with a single interference measurement resource (IMR) for measuring interference. The UE makes a feedback on CSI information induced from CSI processes different from each other with an independent period and a subframe offset.

In particular, each CSI process has an independent CSI feedback configuration. An eNB can inform a UE of association information between a CSI-RS resource and an IMR resource, a CSI feedback configuration and the like according to a CSI process via higher layer signaling such as RRC and the like. For example, as shown in Table 1 in the following, assume that the UE receives three CSI process configurations.

TABLE 1

| CSI Process | Signal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from an eNB 1 corresponding to a serving eNB of a UE and a CSI-RS received from an eNB 2 corresponding to a neighbor eNB participating in cooperation, respectively. Assume that IMRs are respectively set to each of the CSI processes of Table 1 as shown in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

In an IMR 0, an eNB 1 performs muting, an eNB 2 performs data transmission and a UE is configured to measure interference received from other eNBs except the eNB 1 in the IMR 0. Similarly, in an IMR 1, an eNB 2 performs muting, the eNB 1 performs data transmission and the UE is configured to measure interference received from other eNBs except the eNB 2 in the IMR 1. And, in an IMR 2, both the eNB 1 and the eNB 2 perform muting and the UE is configured to measure interference received from other eNBs except the eNB 1 and the eNB 2 in the IMR 2.

Hence, as shown in Table 1 and Table 2, if data is received from the eNB 1, CSI information of a CSI process 0 indicates optimized RI, PMI and CQI information. If data is received from the eNB 2, CSI information of a CSI process 1 indicates optimized RI, PMI and CQI information. If data is received from the eNB 1 and no interference is received from the eNB 2, CSI information of a CSI process 2 indicates optimized RI, PMI and CQI information.

Feedback Measurement Method of MBSFN

MBMS (multicast broadcast multimedia services) use MBSFN (multicast-broadcast single frequency network) transmission that signals received from a plurality of base stations different from each other are combined with each other in a UE. The combination of the signals makes a difference from UNICAST transmission. Hence, it is difficult to apply a technology applied to the UNICAST transmission to the MBSFN transmission. For example, if there is no feedback such as HARQ and the like to a RAN (radio access network), it is difficult for the RAN to know whether or not a signal is successfully received. In particular, if there is no feedback on the MBSFN transmission, it is difficult to measure transmission quality of the MBMS service. In this case, as a method of optimizing and verifying the MBSFN transmission, there is a manual drive test method. Yet, in case of using the manual drive test method, it may cause considerable amount of expense, carbon dioxide emissions, and restriction according to a positon of a user using the MBMS service. Hence, it is required to have a new method for feedback information of the MBSFN transmission.

Unlike legacy RSRP, MBSFN RSRP (reference signal received power) is measured on the basis of an MBSFN RS. The MBSFN RSRP can be defined as follows.

The MBSFN RSRP is defined by a linear average for power contributions [W] of a resource element in which an MBSFN RS is transmitted in a considered measurement frequency bandwidth. It may use the MBSFN RS to determine the MBSFN RSRP.

MBSFN RSRQ (reference signal received quality) corresponds to a ratio of MBSFN RSRP to MBSFN RSSI. Specifically, the MBSFN RSRQ is defined as (N×MBSFN RSRP)/(E-UTRA carrier MBSFN RSSI). In this case, N corresponds to the number of RBs of E-UTRA carrier MBSFN RSSI measurement bandwidth. A reference point of the MBSFN RSRQ may correspond to an antenna connector of a UE.

And, the MBSFN RSRP and the MBSFN RSRQ are defined according to an MBSFN area. In this case, the MBSFN RSRP and the MBSFN RSRQ are measured on the basis of an MBSFN RS used in a corresponding MBSFN area.

An MBSFN RSSI (received signal strength indicator) is defined as follows. E-UTRA Carrier MBSFN RSSI indicates a linear average of total received power (unit [W]) observed by a UE from all sources including a co-channel serving cell, a non-serving cell, adjacent cell interference, thermal noise and the like during specific OFDM symbols in a measurement bandwidth of N number of RBs.

Embodiment 1

Embodiment 1 according to the present invention relates to a method of determining a position of an OFDM symbol for measuring MBSFN RSSI. Specific OFDM symbols for measuring MBSFN RSSI can be determined by one of embodiments 1-1 to 1-5 described in the following.

Embodiment 1-1

According to an embodiment 1-1, MBSFN RSSI can be determined by a linear average of total reception power (unit [W]) measured in OFDM symbols including an MBSFN RS only.

Legacy RSSI and RSRP are measured in an identical symbol. As a concept generally extended from this, it is able to define MBSFN RSSI and MBSFN RSRP to be measured in an identical symbol. In particular, it may use OFDM symbols including an MBSFN RS only to measure MBSFN RSSI.

Figure 11:
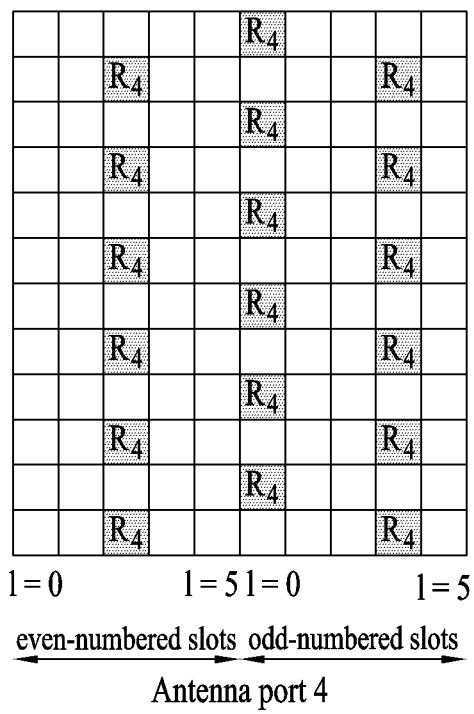
FIG. 11 is a diagram for an example of mapping an MBSFN reference signal in case of an extended CP.

CRS interference interfering MBSFN data, which is interfered by an interfering cell, may be reflected to a part of the OFDM symbols. For example, CRS interference of a neighbor cell using an extended CP exists in an $0^{th}$ OFDM symbol of an odd number slot in FIG. 11. As a result, partial CRS interference is reflected to MBSFN RSSI. Yet, since only a part of the CRS interference is reflected to the RSSI, it may generate MBSFN RSRQ of which interference is mitigated compared to actual interference.

Embodiment 1-2

According to an embodiment 1-2, MBSFN RSSI can be determined by a linear average of total reception power (unit [W]) measured in all OFDM symbols in an MBSFN region.

In particular, in order to generate MBSFN RSRQ to which CRS interference of a neighbor cell is reflected, OFDM symbols utilized for measuring MBSFN RSSI can be defined as all OFDM symbols exiting in an MBSFN region. Since all CRSs of an interfering cell affecting MBSFN data exist in all OFDM symbols existing in the MBSFN region, if RSSI is measured using the CRSs, interference can be more precisely reflected compared to the embodiment 1-1.

And, for example, since a CRS always performs transmission even in a situation that a neighbor cell does not perform data transmission, it is mandatory to reflect CRS interference to MBSFN RSSI to generate accurate MBSFN RSRQ. In this case, according to the embodiment 1-1, since only a part of the total CRS interference is reflected to the MBSFN RSSI or no CRS interference is reflected to the MBSFN RSSI, MBSFN RSRQ is generated on the basis of a value smaller than interference actually received by a UE. Yet, according to the embodiment 1-2, since it is able to generate MBSFN RSRQ to which all CRS interference are reflected, it is able to precisely report the MBSFN RSRQ.

Embodiment 1-3

According to an embodiment 1-3, MBSFN RSSI can be determined by a linear average of total reception power (unit [W]) measured in OFDM symbols only of an antenna port 0 of an interference cell CRS in an MBSFN area.

A neighbor cell performing non-MBSFN transmission always causes CRS interference to MBSFN data irrespective of whether or not the neighbor cell transmits data. Since a CRS has coverage bigger than coverage of data, the CRS causes interference stronger than interference of interference data. Hence, in order to measure precise MBSFN RSRQ, it is mandatory to properly reflect CRS interference to MBSFN RSSI. To this end, the embodiment 1-3 proposes a method of measuring MBSFN RSSI in a symbol in which a CRS of a neighbor cell exists.

According to the embodiment 1-3, since MBSFN RSSI is measured for a symbol in which an interference CRS exists, interference is more strongly reflected to the MBSFN RSSI compared to MBSFN RSSI measured for all symbols existing in an MBSFN region. For this reason, the MBSFN RSSI calculated according to the embodiment 1-3 may be regarded as a worst case RSSI.

A position of a neighbor cell CRS may vary according to a CP (cyclic prefix) of an OFDM used by a neighbor cell. Hence, it is necessary for a UE receiving MBMS to know OFDM CP information of the neighbor cell and the UE changes an OFDM symbol for which MBSFN RSSI is measured based on the OFDM CP information.

The CP information of the neighbor cell can be exchanged between the neighbor cell and an MBSFN network through coordination preconfigured between them. Or, the neighbor cell delivers the CP information of the neighbor cell to the MBSFN network and the MBSFN network can inform an MBMS reception UE of the CP information via signaling such as RRC and the like. If a channel on which control information is transceived between an interference cell and the MBMS reception UE is formed, it is able to directly receive the CP information through the channel.

If a CP used by the neighbor cell corresponds to an extended CP, RSSI is measured in symbols in which a CRS port 0 of the neighbor cell is transmitted, i.e., a symbol 0 of a first slot and a symbol 0 and 3 of a second slot in an MBSFN subframe. For clarity, the symbol used for measuring RSSI is called a symbol set A.

If a CP used by the neighbor cell corresponds to a normal CP, an MBSFN OFDM symbol and a neighbor cell OFDM symbol are not matched with each other in a time axis. In this case, RSSI is measured in symbols overlapped with all or a part of symbols in which a neighbor cell CRS port 0 is transmitted, i.e., a symbol 3 and 4 of a first slot and a symbol 0, 3 and 4 of a second slot in an MBSFN subframe. For clarity, the symbol used for measuring RSSI is called a symbol set B.

Or, in order to simply implement a UE, the UE can measure RSSI using symbols existing in the set A corresponding to an intersection of the symbol set A and B irrespective of a CP of a neighbor cell. Or, the UE can measure RSSI using symbols existing in the set B corresponding to a union of the symbol set A and B.

The set A and B are valid when a subframe of the neighbor cell and a subframe of the MBSFN network are synchronized with each other. Yet, although the subframes are not synchronized with each other, it may be able to use the set A and B in a manner of reconfigure the set A and B using an identical method.

Although the set A and B are defined under an assumption that subcarrier spacing of the MBSFN network corresponds to $\Delta f=15$ kHz, if the subcarrier spacing of the MBSFN network corresponds to f=75 kHz the method mentioned earlier in the embodiment 1-3 can be used in a manner of reconfiguring the set A and B on the basis of a symbol position of a CRS corresponding to a neighbor cell antenna port 0.

Embodiment 1-4

According to an embodiment 1-4, MBSFN RSSI can be determined by a linear average of total reception power (unit [W]) measured in OFDM symbols of an antenna port 0 of an interference cell CRS and an MBSFN RS in an MBSFN area.

In case of the MBSFN RSRQ calculated using the embodiment 1-1, since MBSFN RSSI and MBSFN RSRP respectively corresponding to a numerator and a denominator are calculated in an identical symbol, a power ratio for a same resourcecan be efficiently represented. On the contrary, according to the embodiment 1-2 and 1-3, although a symbol for measuring MBSFN RSSI and a symbol for measuring MBSFN RSRP may be different from each other, it is able to efficiently reflect CRS interference.

According to the embodiment 1-4, when a symbol for measuring MBSFN RSSI is determined, since the symbol includes both a symbol for measuring MBSFN RSRP and a symbol in which an interference CRS exists, MBSFN RSSI and MBSFN RSRP are calculated for a considerable amount of same symbols while CRS interference is appropriately reflected to RSRQ.

Embodiment 1-5

According to an embodiment 1-5, MBSFN RSSI can be determined by a linear average of total reception power (unit [W]) measured in OFDM symbols, which are designated to a UE by a network. For example, a network/base station designates an OFDM symbol in which MBSFN RSSI is measured to a UE via signaling such as RRC and the like.

Embodiment 2

An embodiment 2 relates to a method of configuring a frequency time resource region for which RSSI is measured.

In order to calculate the MBSFN RSSI, a UE averages received signal power of a specific frequency time resource. In this case, according to the embodiment 2, a base station designates a time frequency resource region to be averaged to the UE. The UE performs averaging for a target of an RE satisfying the aforementioned MBSFN RSSI definition in the resource region.

If the base station designates a time frequency resource region corresponding to an average target, it may be able to more accurately calculate MBSFN RSRQ in environment in which interference power is fluctuating instead of being flat in a time axis or a frequency axis. In particular, the base station configures the time frequency resource region corresponding to the average target to be wider in consideration of the interference fluctuation. As a result, it is able to prevent an error of the UE making a decision on MBSFN RSSI according to instant interference amount appearing in a specific subframe/RB from being occurred.

For example, if the UE calculates RSSI based on a single MBSFN subframe in environment in which interference fluctuation is strong, MBSFN RSSI is calculated depending on an instant interference amount of the MBSFN subframe. Yet, if an interference amount is considerably changed in a next MBSFN subframe, it is difficult to utilize RSRQ, which is calculated on the basis of the MBSFN RSSI, as a metric for determining an MBSFN shadow area in the view of long term.

A time region becoming a target of the averaging corresponds to an MBSFN subframe only. The time region can be delivered in a bitmap form or a window size form. According to a bitmap scheme, a bitmap exists for an MBSFN subframe existing during an MBSFN RSSI measurement period and an MBSFN subframe to be averaged is set to 1. A window size can be delivered with n value. Having received the value, a UE calculates MBSFN RSSI in a manner of performing averaging on the n number of MBSFN subframes existing during the MBSFN RSSI measurement period.

A subframe offset k can be configured to the UE together with the window size. The UE calculates MBSFN RSSI in a manner of performing averaging on the n number of MBSFN subframes sequentially existing from a subframe offset during the MBSFN RSSI measurement period. For example, when a measurement period corresponds to 200 ms, the measurement period corresponds to subframes ranging from a subframe 0 to a subframe 199, an offset corresponds to 1 and n corresponds to 10, the UE calculates MBSFN RSSI in a manner of performing averaging on 10 MBSFN subframes sequentially exiting from a subframe 1 corresponding to the offset.

Or, a subframe offset k and an end subframe l can be configured to the UE. The UE calculates MBSFN RSSI in a manner of performing averaging on all MBSFN subframes between a subframe offset and the end subframe l during the MBSFN RSSI measurement period. For example, when a measurement period corresponds to 200 ms, the measurement period corresponds to subframes ranging from a subframe 0 to a subframe 199, an offset corresponds to 1 and an end subframe corresponds to 10, the UE calculates MBSFN RSSI in a manner of performing averaging on MBSFN subframes sequentially exiting between a subframe 1 corresponding to the offset and a subframe 10.

Or, a base station configures a minimum resource region for overcoming interference fluctuation instead of a resource region designated to a UE and the UE can measure MBSFN RSSI for the minimum resource region or a region including the minimum resource region.

Although the method of the embodiment 2 is described on the basis of MBSFN RSSI, the method can also be applied to calculation of MBSFN RSRP. For example, when a UE determines MBSFN RSRQ, MBSFN RSSI and MBSFN RSRP can be determined in a manner of performing averaging on the determined same frequency time resource region. Yet, in this case, the MBSFN RSRP is also determined based on the RE satisfying the aforementioned MBSFN RSRP definition.

Or, similar to a legacy RSRP calculation scheme, a resource region becoming a measurement target is autonomously determined by a UE and RSSI can be measured based on the determined same frequency time resource region only.

Embodiment 3

An embodiment 3 relates to a multiple RSRQ reporting scheme.

If an interference cell uses a partial band only among a frequency bandwidth of an MBSFN network, the interference cell generates interference to the partial band only among the whole of the MBSFN bandwidth. For example, if the MBSFN network uses a bandwidth of 10 MHz for a band A and the interference cell uses a bandwidth of 5 MHz in the same band A, the interference cell generates interference to a partial band only corresponding to 5 MHz among the MBSFN band. In this case, a UE calculates MBSFN RSSI for a specific band only among the whole of the MBSFN band and makes a report on MBSFN RSRQ using a value of the MBSFN RSSI. In a broad sense, the UE calculates MBSFN RSSI for each of a plurality of specific bands of which interference of a neighbor cell varies and makes a report on each MBSFN RSRQ using the value. For example, the UE divides the whole band of 10 MHz of MBSFN into a lower 5 MHz band as a subband A and a higher 5 MHz band as a subband B, calculates MBSFN RSSI and MBSFN RSRQ according to each subband and makes a report on the two MBSFN RSRQs to the base station.

Similarly, it is also able to measure MBSFN RSRP for a partial band and the UE is able to make a report on MBSFN RSRP according to each subband.

Embodiment 4

An embodiment 4 relates to an MBSFN UE measurement resource determined by UE speed.

As mentioned earlier in the aforementioned embodiment 2, it is able to calculate more accurate MBSFN RSRQ in environment in which interference power is fluctuating instead of being flat in a time or frequency axis in a manner that a base station designates a time frequency resource region becoming an averaging target of MBSFN UE measurement.

According to the embodiment 4, a UE can additionally configure the time frequency resource region becoming the averaging target of the MBSFN UE measurement on the basis of speed of the UE. In particular, a fast moving UE configures a time frequency resource region to be narrower and a slowly moving UE configures the time frequency resource region to be wider.

The fast moving UE is quickly getting out of an MBSFN shadow area or quickly enters a shadow area. In this case, if a time resource becoming an average target of the MBSFN UE measurement is configured to be long, a calculated metric may be incorrect. This is because it is highly probable that a UE enters the MBSFN shadow area from the outside of the shadow area or is getting out of the shadow area during long time becoming an average target. In this case, since a signal size at the inside of the shadow area, a signal size at the outside of the shadow area and an SINR value are all averaged in a calculated metric, it is difficult for a base station to determine the shadow area based on the metric.

On the contrary, the slowly moving UE stays at the MBSFN shadow area for a long time or stays at the outside of the shadow area for a long time. Hence, in this case, although a time resource becoming an average target of the MBSFN UE measurement is configured to be long, it is highly probable that a calculated metric is accurate. And, since the metric is calculated in a manner of averaging resources for a long time, there may exist many numbers of average samples. Consequently, it may be able to calculate a metric of high accuracy.

Embodiment 5

An embodiment 5 relates to MBSFN CQI.

In order to calculate legacy CQI, a UE measures a channel on the basis of a CRS or a CSI-RS and calculates a highest MCS satisfying FER 0.1 in a CSI reference resource. On the contrary, in order to calculate MBSFN CQI, the UE measures a channel on the basis of an MBSFN RS and calculates a highest MCS satisfying BLER 0.1 in a CSI reference resource.

According to the embodiment 5, when the MBSFN CQI is calculated, as mentioned above, it is able to calculate MCS for a variable BLER without calculating MCS for a fixed BLER.

For example, a base station indicates a target BLER to a UE via RRC and the UE makes a report on CQI in a manner of obtaining MCS satisfying the target BLER.

As mentioned in the foregoing description, if the base station indicates the target BLER, a network can differently manage service quality (QoS) according to a type of an MBMS service.

If this scheme is used, the base station is able to know the degree of BLER affecting each UE caused by MCS of currently transmitted MBMS data. For example, if two UEs receive MBMS, a UE 1 is positioned at an MBMS shadow area and a UE 2 is positioned at a region of which an MBSFN reception rate is high, a target BLER 0.2 and 0.001 are set to the UE 1 and the UE 2, respectively. When MCS of current MBSFN data corresponds to 10, if UE 1 and the UE 2 respectively report MCS 10, the base station is able to know that the BLER of the UE 1 and the BLER of the UE 1 correspond to 0.2 and 0.001, respectively.

Embodiment 6

An embodiment 6 relates to a method of indicating an MBSFN UE measurement resource via RRC based on a FEC protection period.

A UE performs correction for a packet error through FEC (forward error correction) in an AL (application layer) among OSI 7 layers. To this end, a base station generates a single FEC source block on the basis of RTP packets generated during a protection period in the application layer and generates repair symbols in a manner of applying a raptor code to the source block. The generated source symbol and the repair symbol are transmitted over scores of subframes or several hundred of subframes in a physical layer.

A base station uses MBSFN UE measurement to determine a code rate of the AL FEC. In this case, it is necessary to for the base station to designate a time frequency resource becoming an average target of the MBSFN UE measurement to configure a proper code rate. This is because, if the MBSFN UE measurement is calculated in a part of minor subframes only among subframes in which a single FEC source block and a repair symbol corresponding to the FEC source block are transmitted, the calculated value is not accurate for determining the code rate of the AL FEC. For example, when a single FEC source block and a repair symbol are transmitted over 100 ms, if a UE calculates the MBSFN UE measurement on the basis of a single subframe only, it is difficult for the metric to sufficiently reflect channel diversity during 100 ms.

Hence, it is necessary for the base station to estimate transmission time in a manner of checking a subframe in which a single FEC source block and a repair symbol corresponding to the FEC source block are initially transmitted and determine a time frequency resource region becoming an average target of the MBSFN UE measurement based on an estimated value. The base station indicates the determined time frequency resource region to the UE via RRC signaling.

Figure 12:
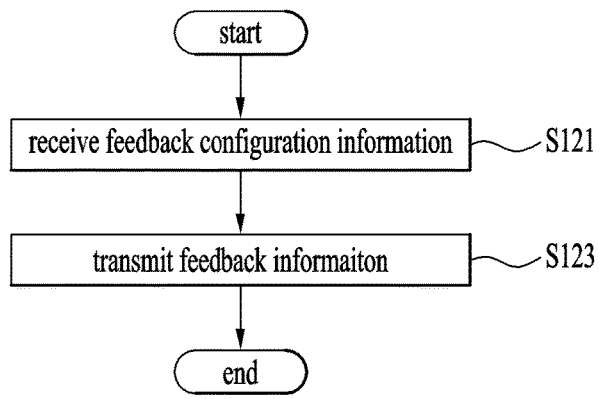
FIG. 12 is a flowchart for a method of reporting feedback capable of being applied to one embodiment of the present invention.

A method of making a feedback according to one embodiment of the present invention is explained in the following with reference to FIG. 12.

In the step S121, a UE receives configuration information for feedback information of MBSFN transmission. In this case, the configuration information corresponds to information for configuring the feedback methods mentioned earlier in the embodiments 1 to 6. A technical characteristic of the configuration information follows the aforementioned contents.

In the step S123, the UE transmits feedback information which is measured in a resource region according to the configuration information. The feedback information can include at least one selected from the group consisting of the aforementioned MBSFN RSRP, the MBSFN RSRQ, and the MBSFN RSSI.

Figure 13:
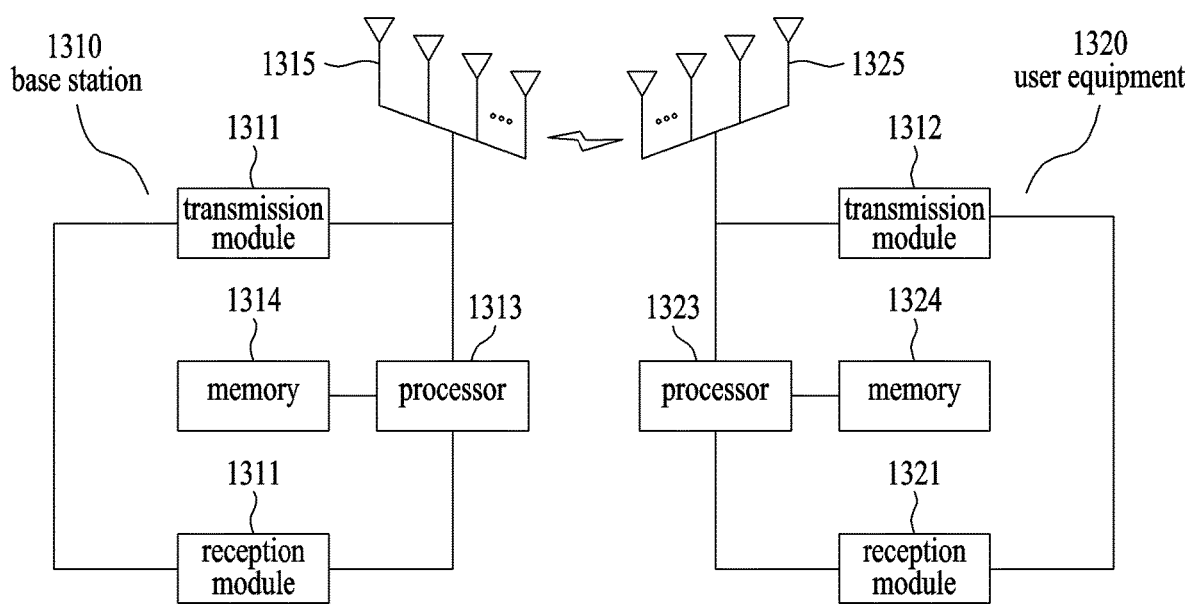
FIG. 13 is a diagram for a base station and a user equipment capable of being applied to one embodiment of the present invention.

FIG. 13 is a diagram for a base station and a user equipment capable of being applied to one embodiment of the present invention.

If a relay is included in a wireless communication system, communication is performed between a base station and the relay in backhaul link and communication is performed between the relay and a user equipment in access link.

Hence, the base station and the user equipment shown in the drawing can be replaced with the relay in accordance with a situation.

Referring to FIG. 13, a wireless communication system includes a base station (BS) 1310 and a user equipment (UE) 1320. The BS 1310 includes a processor 1313, a memory 1314 and a radio frequency (RF) unit 1311/1312. The processor 1313 can be configured to implement the proposed functions, processes and/or methods. The memory 1314 is connected with the processor 1313 and then stores various kinds of information associated with an operation of the processor 1313. The RF unit 1316 is connected with the processor 1313 and transmits and/or receives a radio signal. The user equipment 1320 includes a processor 1323, a memory 1324 and a radio frequency (RF) unit 1321/1422. The processor 1323 can be configured to implement the proposed functions, processes and/or methods. The memory 1324 is connected with the processor 1323 and then stores various kinds of information associated with an operation of the processor 1323. The RF unit 1321/1322 is connected with the processor 1323 and transmits and/or receives a radio signal. The base station 1310 and/or the user equipment 1320 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The present invention can be used for a wireless communication device such as a user equipment, a relay, a base station and the like.

What is claimed is:

1. A method for reporting feedback information of Multicast-Broadcast Single-Frequency Network (MBSFN) transmission by a user equipment (UE) in a wireless communication system, the method comprising:
   receiving configuration information for feedback information of the MBSFN transmission when the UE receives signals from a plurality of base stations based on the MBSFN transmission,
   wherein the configuration information includes first information on a number of MBSFN subframes to be used for measurement and second information on a subframe offset informing a starting subframe for the measurement; and
   transmitting the feedback information obtained from a resource region, based on the configuration information,
   wherein the UE receives a common reference signal (CRS) of an antenna port 0 of an interference cell in an MBSFN area,
   wherein the measurement is performed for a plurality of MBSFN subframes consecutively from the starting subframe, in the resource region, based on the first and the second information,
   wherein the feedback information includes an average result value for measurement results obtained from the plurality of MBSFN subframes,
   wherein each of the measurement results is obtained based on considering a position of a symbol allocated for the CRS of the antenna port 0 of the interference cell in each of the plurality of MBSFN subframes,
wherein a number of the plurality of MBSFN subframes used for obtaining the average result for the measurement is dynamically configured based on a velocity of the UE,
wherein a number of the plurality of MBSFN subframes configured when the UE is in a first velocity is smaller than a number of plurality of MBSFN subframes configured when the UE is in a second velocity, and
wherein the first velocity is a velocity faster than the second velocity.

2. The method of claim 1, wherein when a cyclic prefix (CP) of the interference cell is an extended CP, each of the measurement results is based on an MBSFN received signal strength indicator (RSSI) measured in the position of the symbol in which the CRS of the antenna port 0 of the interference cell is transmitted.

3. The method of claim 2, wherein each of the measurement results includes the MBSFN RSSI measured in a symbol 3 of a first slot, and a symbol 0 and a symbol 3 of a second slot in each of the plurality of MBSFN subframes.

4. The method of claim 1, wherein when a cyclic prefix (CP) of the interference cell is a normal CP, each of the measurement results is based on an MBSFN received signal strength indicator (RSSI) measured in a symbol position at which an MBSFN symbol and all or a part of the symbol in which the CRS of the antenna port 0 of the interference cell are overlapped.

5. The method of claim 4, wherein each of the measurement results includes the MBSFN RSSI measured in a symbol 3 and a symbol 4 of a first slot, and a symbol 0, a symbol 3 and a symbol 4 of a second slot in each of the plurality of MBSFN subframes.

6. The method of claim 1, wherein each of the measurement results is based on an MBSFN received signal strength indicator (RSSI) measured in a symbol 3 and a symbol 4 of a first slot, and a symbol 0, a symbol 3 and a symbol 4 of a second slot in each of the plurality of MBSFN subframes, irrespective of a cyclic prefix (CP) of the interference cell.

7. The method of claim 1, wherein each of the measurement results is based on an MBSFN received signal strength indicator (RSSI) measured in a symbol 3 of a first slot, and a symbol 0 and a symbol 3 of a second slot in each of the plurality of MBSFN subframes, irrespective of a cyclic prefix (CP) of the interference cell.

8. A user equipment (UE) for reporting feedback information of Multicast-Broadcast Single-Frequency Network (MBSFN) transmission in a wireless communication system, the UE comprising:
a transceiver; and at least one processor,
wherein the at least one processor is configured to:
control the transceiver to receive configuration information for feedback information of the MBSFN transmission when the UE receives signals from a plurality of base stations based on the MBSFN transmission,
wherein the configuration information includes first information on a number of MBSFN subframes to be used for measurement and second information on a subframe offset informing a starting subframe for the measurement, and
control the transceiver to transmit the feedback information obtained from a resource region, based on the configuration information,
wherein the UE receives a common reference signal (CRS) of an antenna port 0 of an interference cell in an MBSFN area,
wherein the measurement is performed for a plurality of MBSFN subframes consecutively sequentially from the starting subframe, in the resource region, based on the first and the second information,
wherein the feedback information includes an average result value for measurement results obtained from the plurality of MBSFN subframes,
wherein each of the measurement results is obtained based on considering a position of a symbol allocated for the CRS of the antenna port 0 of the interference cell in each of the plurality of MBSFN subframes,
wherein a number of the plurality of MBSFN subframes used for obtaining the average result for the measurement is dynamically configured based on a velocity of the UE,
wherein a number of the plurality of MBSFN subframes configured when the UE is in a first velocity is smaller than a number of plurality of MBSFN subframes configured when the UE is in a second velocity, and
wherein the first velocity is a velocity faster than the second velocity.

9. The UE of claim 8, wherein when a cyclic prefix (CP) of the interference cell is an extended CP, each of the measurement results is based on an MBSFN received signal strength indicator (RSSI) measured in the position of the symbol in which the CRS of the antenna port 0 of the interference cell is transmitted.

10. The UE of claim 9, wherein each of the measurement results includes the MBSFN RSSI measured in a symbol 3 of a first slot, and a symbol 0 and a symbol 3 of a second slot in each of the plurality of MBSFN subframes.

11. The UE of claim 8, wherein when a cyclic prefix (CP) of the interference cell is a normal CP, each of the measurement results is based on an MBSFN received signal strength indicator (RSSI) measured in a symbol position at which an MBSFN symbol and all or a part of the symbol in which the CRS of the antenna port 0 of the interference cell are overlapped.

12. The UE of claim 11, wherein each of the measurement results includes the MBSFN RSSI measured in a symbol 3 and a symbol 4 of a first slot, and a symbol 0, a symbol 3 and a symbol 4 of a second slot in each of the plurality of MBSFN subframes.

13. The UE of claim 8, wherein each of the measurement results is based on an MBSFN received signal strength indicator (RSSI) measured in a symbol 3 and a symbol 4 of a first slot, and a symbol 0, a symbol 3 and a symbol 4 of a second slot in each of the plurality of MBSFN subframes, irrespective of a cyclic prefix (CP) of the interference cell.

14. The UE of claim 8, wherein each of the measurement results is based on an MBSFN received signal strength indicator (RSSI) measured in a symbol 3 of a first slot, and a symbol 0 and a symbol 3 of a second slot in each of the plurality of MBSFN subframes, irrespective of a cyclic prefix (CP) of the interference cell.

* * * * *